Aug. 8, 1950 O. A. SHANN 2,518,385

LATCHING MECHANISM FOR TELEPHONE SETS

Filed May 7, 1947 2 Sheets-Sheet 1

INVENTOR
O. A. SHANN
BY
Walter C. Kiesel
ATTORNEY

Aug. 8, 1950 O. A. SHANN 2,518,385

LATCHING MECHANISM FOR TELEPHONE SETS

Filed May 7, 1947 2 Sheets-Sheet 2

INVENTOR
O. A. SHANN
BY
Walter C. Kiesel
ATTORNEY

Patented Aug. 8, 1950 2,518,385

UNITED STATES PATENT OFFICE 2,518,385

LATCHING MECHANISM FOR TELEPHONE SETS

Oscar A. Shann, Short Hills, N. J., assignor to Bell Telephone Laboratories, Incorporated, New York, N. Y., a corporation of New York Application May 7, 1947, Serial No. 746,569

10 Claims. (Cl. 179—100)

The present invention relates to telephone sets and more particularly to such sets of the type comprising a handset and a mounting therefor, wherein means are provided to latch the handset to the mounting.

One object of the invention is to firmly hold a handset to its mounting so that accidental dislodgment is prevented.

Another object of the invention is to positively latch a handset to its mounting so that it cannot be jarred loose when the set is subjected to severe vibrations or shocks.

A further object is to enable readily the release of the handset when use is to be made of the telephone.

Heretofore means have been employed to secure telephones to their mountings, for example, by spring clips of various forms so arranged as to grasp portions of the instrument or by a manually positioned portion of the mounting which prevents movement of the telephone.

This invention contemplates overcoming shortcomings involved in the previous arrangements, namely, the lack of positive securing means to prevent unintentional dislodging of the handset of the first-mentioned type and the inconvenience in mounting and demounting the handset in the second type.

In accordance with one feature of this invention, cooperating elements of the latching mechanism are mounted partly in the handle of the handset and partly in the cradle of the mounting.

Another feature of the invention involves a latching mechanism which is capable of being used on a wall or desk type of mountings.

Another feature of the invention resides in automatic actuation of the latching means when the handset is restored to its mounting.

Still another feature of the invention resides in the provision of an easily actuated button or lever for releasing the latching mechanism.

The invention has been illustrated in the accompanying drawings in which.

Figure 1:
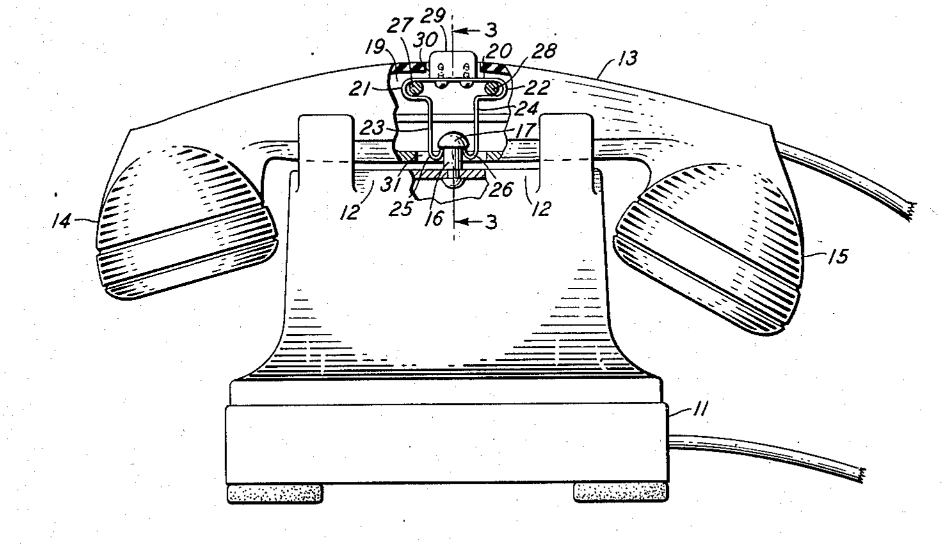
Fig. 1 shows a telephone desk set in which the handset is mounted on a cradle of a mounting, portions of the handset and mounting being removed to reveal clearly one form of this invention.

Referring to the drawing, in Fig. 1, a typical telephone set has been shown comprising a housing or mounting 11, a cradle 12, a telephone handset handle 13 mounted therein and carrying at its ends a receiver 14 and a transmitter 15. A column 16 having on its upper portion a flange 17 with a tapered top is secured to a cradle 12 to form a part of one embodiment of the applicant's invention in regard to the mounting portion. Handle 13 contains a recess 19 accommodating a latching mechanism comprising a resilient band having a central portion 20, supporting loops 21 and 22 and arms 23 and 24 terminating in inwardly bent portions 25 and 26. These portions 25 and 26 are adapted to engage column 16 under its flange 17 as it passes through aperture 31 at the bottom of the handle 13. Pins 27 and 28 are mounted suitably in recess 19, transverse to the longitudinal axis of the handle and are so positioned as to pass through the loops 21 and 22 and thereby support the latching mechanism. Located centrally on the resilient latch band between supports 27 and 28 is a button 29 having its upper portion protruding through an aperture 30 in the top of handle 13 to provide a means whereby the latching mechanism can be disengaged. The button 29 may be suitably fixed to the band 20 as by screws or it may be of a form to rest loosely against said band.

Figure 2:
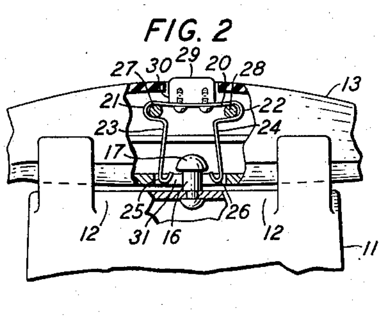
Fig. 2 is a partial view of a mounting and handset with portions thereof broken away to show the securing means for the handset in the released position.
Figure 3:
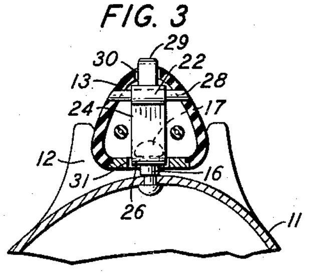
Fig. 3 shows a cross-section of Fig. 1 as taken along the line 3—3.

When the handset is placed in the cradle, the portions 25 and 26 of the latching arms are forced apart and allowed to latch under flange 17, by the camming action of the tapered top of column 16 as it passes through aperture 31. To release the handset for use, button 29 is depressed causing arms 23 and 24 to pivot around pins 27 and 28 and away from column 16 as shown in Fig. 2, thus disengaging portions 25 and 26 from flange 17 and permitting removal of the handset. The release of button 29 allows the resilient latch to assume its normal position so that it may engage column 16 when the set is replaced with no further action required of the user.

Figure 4:
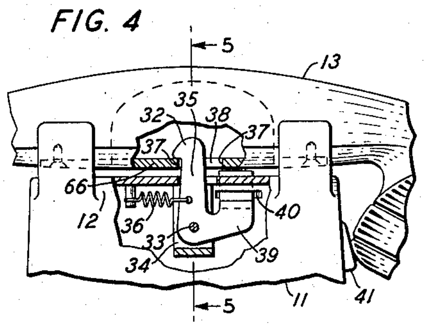
Fig. 4 illustrates another form of the securing means of this invention partially sectioned to reveal the operative members.
Figure 5:
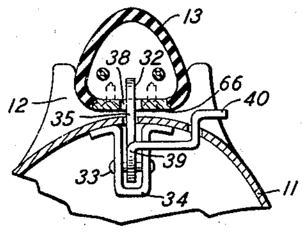
Fig. 5 shows a cross-section of Fig. 4 as taken along the line 5—5.
Figure 6:
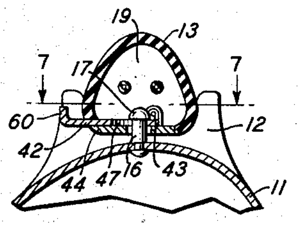
Fig. 6 shows a further modification of the securing means in cross-section.

Figs. 4 and 5 illustrate a further embodiment of this invention in which the movable portion of the latching mechanism is carried in the cradle 12. The mechanism comprises a hook 32 extending into the cradle and pivoted on a pin 33 which is supported by a bracket 34 suitably secured to the under surface of the bottom of cradle 12. Attached at one end to the shank 35 of hook 32 is spring 36 which is suitably fixedly secured at its other end to the under side of the cradle. The spring 36 allows the hook to ride over and then snap back on the cooperating latching edge 37 of aperture 38 located in a metal insert plate 66 which is secured to the handle 13. Lever 39, an integral portion of the latching hook, extends at an angle from the shank 35 to the pivot point 33 and terminates in an offset portion 40 extending from under the cradle to a position outside of the mounting where it may conveniently be depressed to cause the hook to pivot around pin 33 and disengage edge 37.

The aperture 38 in the handle is so positioned that regardless of the position of the handset in the cradle the locking means in the cradle is operative. The axial position of the handset in the cradle and thus the relative positions of the hook 32 and the latching edge 37 are maintained by the member 41 having an inclined surface mounted on the right-hand side of mounting 11 as shown in Fig. 4. This member causes transmitter housing 15 or the receiver housing 14, depending on how the hand telephone is replaced, to ride down its surface as the instrument is placed on the cradle 12 and by its camming action it positions the handset so that the latching elements are operative.

Figure 7:
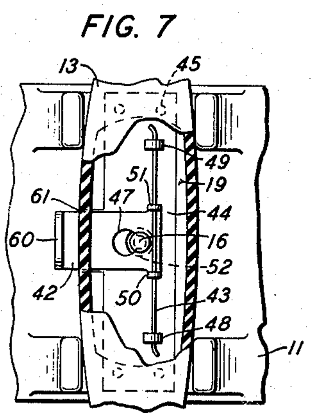
Fig. 7 shows a plan section of that form shown in Fig. 6 taken along the line 7—7.
Figure 8:
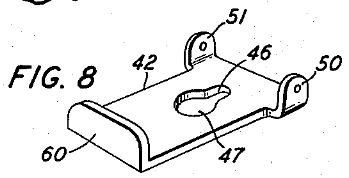
Fig. 8 shows the movable portion of the latching means of Fig. 7 in perspective.

In Fig. 7 a latching means is shown comprising a handset handle 13 containing a recess portion 19 in which is mounted a latch plate 42 shown in perspective in Fig. 8 and an actuating spring 43. The portion of the latch in the mounting is the same as that of Fig. 1, namely, a column 16 flanged at its upper portion 17 where it is engaged by the movable latching element. The latching plate 42 is mounted centrally within the handle 13 of the handset adjacent an insert plate 44 affixed to the handle by screws 45 threaded into tap holes in a solid portion of the handle. Thus the assembly and maintenance of the mechanism within the handle is greatly facilitated.

Referring to Fig. 8 showing the movable member of the latch means shown in Fig. 7 in which a slot 46 is formed in the center of the latch plate 42 and is terminated in an enlarged opening 47 adapted to receive the flanged top of the column 16. The spring 43, secured by lugs 48 and 49 carried on the insert plate 44 is attached by apertured lugs 50 and 51 on the latch plate. Normally this latch plate is so positioned that the enlarged open portion 47 does not register with the insert aperture 52 in plate 44 which is adapted to admit the column into the handle 13, but, instead, a part of this larger opening and a slot register with aperture 52.

Figure 10:
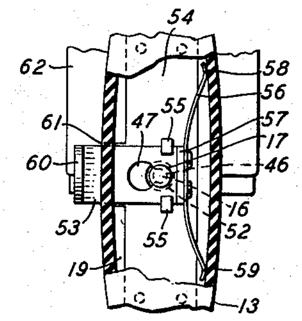
Fig. 10 shows a plan view of a section of Fig. 9 taken along the line 9—9.

A modification of the latch arrangement of Fig. 7 is illustrated by Fig. 10 in which the latch plate 53 is secured to the insert plate 54 by lugs 55 integral therewith. Bowed spring 56, suitably secured to the latch plate 53 at its turned-up end 57, bears on the inner wall of handle 13 at its end points 58 and 59. As in Fig. 7, there is a centrally located slot 46 terminating in an enlarged opening 47 which is adapted to admit the flanged top of column 16 when it is in registry with aperture 52 and insert plate 53. Spring 56 normally maintains the end 57 of the plate 53 against the fingers 55 and in this position only a portion of the enlarged opening registers with the aperture 52, the remainder of said aperture being in registry with the slotted portion 46.

In placing a handset containing the latch plate of Fig. 7 or Fig. 10 on the cradle the tapered head of column 16 enters aperture 52 and extends partially through the slot 46 and registering portion of the opening 47 where it produces a camming action on the edge of said opening causing the plate 42 or 53, as the case may be, to move transverse to the axis of the handle to a position where the enlarged opening registers with the aperture 52 and admits the top of the column. When the flange 17 has passed beyond the upper surface of the latch plate, said plate slides back to its normal position securing the handset to its mounting by the engagement of the edges of slot 46 under said flange. To release the handset, the bent extension 60 of the latch plate which passes to the exterior of the handle 13 through slot 61 is pressed against the side of the handle causing the plate to slide across the handle so that the enlarged opening 47 is in registry with aperture 52 thus releasing the handset so that it can be lifted from its mounting.

Figure 9:
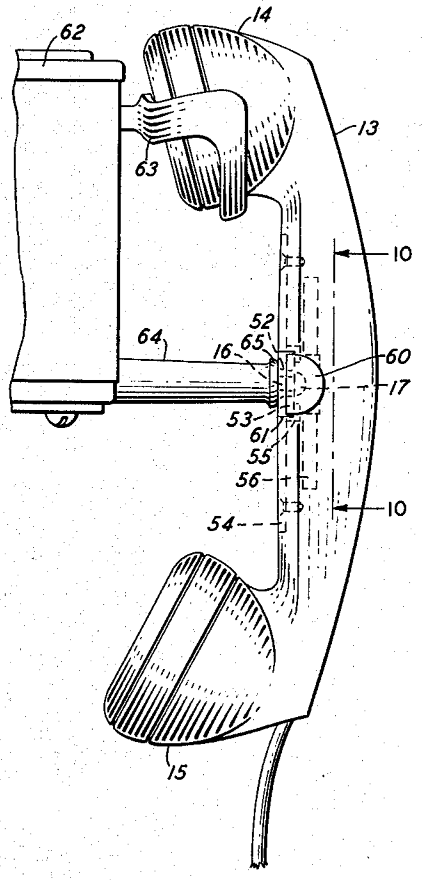
Fig. 9 shows a wall mounting embodying securing means of this invention cooperating with a modification of the latching means of Fig. 7.

An adaptation of this latching means for a wall mounting comprising a housing 62, associated and electrical mechanical elements (not shown), and a switchhook 63 is shown in Fig. 9. The latching mechanism shown employs the moving member of Fig. 10, however, the stationary portion of the latch in the mounting may be combined with the handset portion of the latch shown in Figs. 1 and 7 also. The portion of the latching mechanism for the mounting comprises an extension arm 64 having an end surface 65 which extends to the position normally taken by the handset handle 13 when mounted on switchhook 63. Carried on the end surface 65 is column 16 having the flange 17 with a tapered top, said column performing the same functions in the same manner, while cooperating with the latching means in the handset, as the corresponding column did in the desk mountings of Figs. 1, 2, 3, 6 and 7.

In view of the foregoing it is apparent that a desk or wall mounting for a hand telephone is provided with simple, rugged latching means which are positive in operation and require a minimum of effort on the part of the user to engage or disengage the hand telephone.

What is claimed is:

1. A telephone set comprising a hand telephone, a mounting, and cooperating latching members, one of said latching members being within the handle of said telephone, and another of said latching members being associated with said mounting for engaging said first-mentioned latching member to positively lock said telephone to said mounting as it is placed thereon.

2. A telephone set comprising a hand telephone, a mounting, a stationary latching member associated with said mounting, and a movable latching member within said hand telephone and operative to engage said stationary member and to lock said telephone to said mounting as it is placed thereon.

3. A telephone set comprising a hand telephone, a mounting, a stationary latching member in the handle of said telephone, a movable latching member associated with said mounting and operative as said telephone is placed on said mounting to engage said stationary member and lock said telephone to said mounting.

4. A telephone set comprising a hand telephone having a handle, a mounting having a cradle adapted to receive and support said handle, a column mounted in said cradle and provided at its top with a flange, a latching means within said handle adapted to engage the flange of said column and operative when the telephone is placed on said cradle to secure said telephone to said mounting.

5. A telephone set comprising a hand telephone having a handle, a mounting including a cradle for supporting said handle, a column associated with said cradle and provided at its top with a flange, a resilient latching member within said handle adapted to engage the flange of said column as the telephone is placed on said cradle, and a releasing member for disengaging the latching member from said column.

6. A telephone set comprising a hand telephone having a handle, a mounting having a cradle to receive and support said handle, a column mounted in said cradle and provided at its top with a flange, a latching plate slidably mounted within said handle having a slot formed therein which is terminated in an enlarged opening, and a spring tending to retain said plate in a locked position, the edges of said slot engaging the under side of said flange and allowing said plate to move transversely to said handle to admit the flanged top of said column through said enlarged opening when said telephone is placed on said mounting or is to be removed therefrom.

7. A telephone set comprising a hand telephone having a handle with an opening in one surface, a mounting having a cradle adapted to receive and support said telephone, a latch within said cradle so positioned as to positively engage said handle at the edge of said opening as it is placed on said cradle, a spring tending to retain said latch in its locked position and allowing it to engage said handle, and means to release said latch.

8. A telephone set comprising a hand telephone having a handle, a mounting having a cradle to receive and support said handle, a latching member within said handle, and a cooperating latching member within said cradle.

9. A telephone set comprising a hand telephone having a handle, a support for said handle, a column mounted adjacent said support and having a flange at its top, and means comprising a latch within said handle positioned to engage said flange when the telephone is placed on said support for securing said telephone to said mounting.

10. A telephone set comprising a hand telephone having a handle, a support for said handle, a column mounted adjacent said support and provided at its top with a flange, a latching plate slidably mounted within said handle having a slot formed therein which terminates in an enlarged opening, and a spring tending to retain said plate in a locked position, the edges of said slot engaging the other side of said flange and allowing said plate to move transversely to said handle to admit said flange of said column through said enlarged opening when said telephone is placed on said mounting or is to be removed therefrom.

OSCAR A. SHANN.

REFERENCES CITED

The following references are of record in the file of this patent:

UNITED STATES PATENTS

| Number | Name | Date |
|---|---|---|
| 243,161 | Ross | June 21, 1881 |
| 780,417 | Euphrat | Jan. 17, 1905 |
| 1,053,765 | Wren | Feb. 18, 1913 |
| 1,475,526 | Waskins | Nov. 27, 1923 |
| 1,580,666 | Hansen | Apr. 13, 1926 |
| 2,078,321 | Freiman | Apr. 27, 1937 |
| 2,355,464 | Obergfell | Aug. 8, 1944 |
| 2,380,782 | Owens | July 31, 1945 |
| 2,428,091 | Obergfell | Sept. 30, 1947 |

FOREIGN PATENTS

| Number | Country | Date |
|---|---|---|
| 541,874 | France | Aug. 2, 1922 |